United States Patent
Okudera

(10) Patent No.: US 9,638,916 B2
(45) Date of Patent: May 2, 2017

(54) IMAGE PROCESSING DEVICE FOR CORRECTING CHROMATIC ABERRATION

(71) Applicant: SOCIONEXT INC., Yokohama-shi, Kanagawa (JP)

(72) Inventor: Hirotaka Okudera, Iwakura (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/698,324

(22) Filed: Apr. 28, 2015

(65) Prior Publication Data

US 2015/0334360 A1 Nov. 19, 2015

(30) Foreign Application Priority Data

May 19, 2014 (JP) ................. 2014-103423

(51) Int. Cl.
| | | |
|---|---|---|
| G02B 27/00 | (2006.01) | |
| H04N 9/12 | (2006.01) | |
| G03B 9/02 | (2006.01) | |
| G03B 7/095 | (2006.01) | |
| G02B 5/00 | (2006.01) | |
| H04N 9/64 | (2006.01) | |

(52) U.S. Cl.
CPC ......... *G02B 27/0025* (2013.01); *G03B 7/095* (2013.01); *G03B 9/02* (2013.01); *H04N 9/12* (2013.01); *H04N 9/64* (2013.01); *G02B 5/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,088,537 A | * | 7/2000 | Ohtaka | ............ G02B 7/28 396/81 |
| 6,630,960 B2 | * | 10/2003 | Takahashi | ............ H04N 5/2351 348/229.1 |
| 7,098,955 B2 | | 8/2006 | Koyama et al. | |
| 8,194,136 B1 | * | 6/2012 | Askey | ............ G01M 11/0264 348/175 |
| 2006/0188245 A1 | * | 8/2006 | Koyama | ............ H04N 5/238 396/257 |
| 2009/0009633 A1 | * | 1/2009 | Suto | ............ H04N 9/045 348/241 |

(Continued)

FOREIGN PATENT DOCUMENTS

| | | |
|---|---|---|
| EP | 2 354 843 A1 | 8/2011 |
| JP | 2002-204390 A | 7/2002 |

(Continued)

*Primary Examiner* — Twyler Haskins
*Assistant Examiner* — Akshay Trehan
(74) *Attorney, Agent, or Firm* — Arent Fox LLP

(57) ABSTRACT

An image processing device includes a signal processing circuit, a chromatic aberration extraction circuit, and a diaphragm control circuit. The signal processing circuit generates image data by signal-processing output data generated by an image sensor in accordance with light passing through a diaphragm and a lens. The chromatic aberration extraction circuit extracts a chromatic aberration from the image data. The diaphragm control circuit changes an f-number of the diaphragm. The diaphragm control circuit sets the f-number of the diaphragm based on the chromatic aberration extracted by the chromatic aberration extraction circuit.

5 Claims, 5 Drawing Sheets

(56) References Cited

U.S. PATENT DOCUMENTS

| | | | | |
|---|---|---|---|---|
| 2010/0026875 A1* | 2/2010 | Shirai | ............... | G03B 17/18 |
| | | | | 348/335 |
| 2011/0194851 A1* | 8/2011 | Hjelmstrom | ............ | G03B 7/095 |
| | | | | 396/242 |
| 2012/0081583 A1* | 4/2012 | Kikuchi | ............... | H04N 9/045 |
| | | | | 348/242 |
| 2012/0300112 A1* | 11/2012 | Natsume | ............... | G03B 5/02 |
| | | | | 348/336 |
| 2015/0334360 A1* | 11/2015 | Okudera | ............... | H04N 9/12 |
| | | | | 348/222.1 |

FOREIGN PATENT DOCUMENTS

| | | |
|---|---|---|
| JP | 2010-81002 A | 4/2010 |
| JP | 2011-164614 A | 8/2011 |

* cited by examiner

IMAGE PROCESSING DEVICE FOR CORRECTING CHROMATIC ABERRATION

CROSS-REFERENCE TO RELATED APPLICATIONS

This application is based upon and claims the benefit of priority from prior Japanese Patent Application No. 2014-103423, filed on May 19, 2014, the entire contents of which are incorporated herein by reference.

FIELD

This disclosure relates to an image processing device, a method for controlling an image processing device, and an imaging device.

BACKGROUND

An imaging device, such as a digital still camera, includes an image sensor and generates image data based on the output data of the image sensor. Japanese Laid-Open Patent Publication Nos. 2011-164614 and 2010-081002 describe examples of the imaging device. The image sensor is, for example, a charge coupled device (CCD) or a complementary metal oxide semiconductor (CMOS). When capturing an image of a subject, light corresponding to the subject enters an image sensor through an optical system including a lens and the like. The image sensor generates output data in correspondence with the amount of incident light. An imaging device performs signal processing (e.g., color balance (or white balance) adjustment) on the output data of the image sensor to generate image data of the captured subject.

In an imaging device, the optical system includes a diaphragm. Poor adjustment of the diaphragm decreases the resolution of the image data obtained by the imaging device. Experience in diaphragm adjustment is necessary to limit decreases in the resolution.

SUMMARY

It is desirable that imaging devices need to limit decreases in the resolution.

One aspect of this disclosure is an image processing device that includes a signal processing circuit, a chromatic aberration extraction circuit, and a diaphragm control circuit. The signal processing circuit generates image data by signal-processing output data generated by an image sensor in accordance with light passing through a diaphragm and a lens. The chromatic aberration extraction circuit extracts a chromatic aberration from the image data. The diaphragm control circuit changes an f-number of the diaphragm. The diaphragm control circuit sets the f-number of the diaphragm based on the chromatic aberration extracted by the chromatic aberration extraction circuit.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

The embodiment, together with objects and advantages thereof, may best be understood by reference to the following description of the presently preferred embodiments together with the accompanying drawings in which.

DESCRIPTION OF THE EMBODIMENTS

Figure 1:
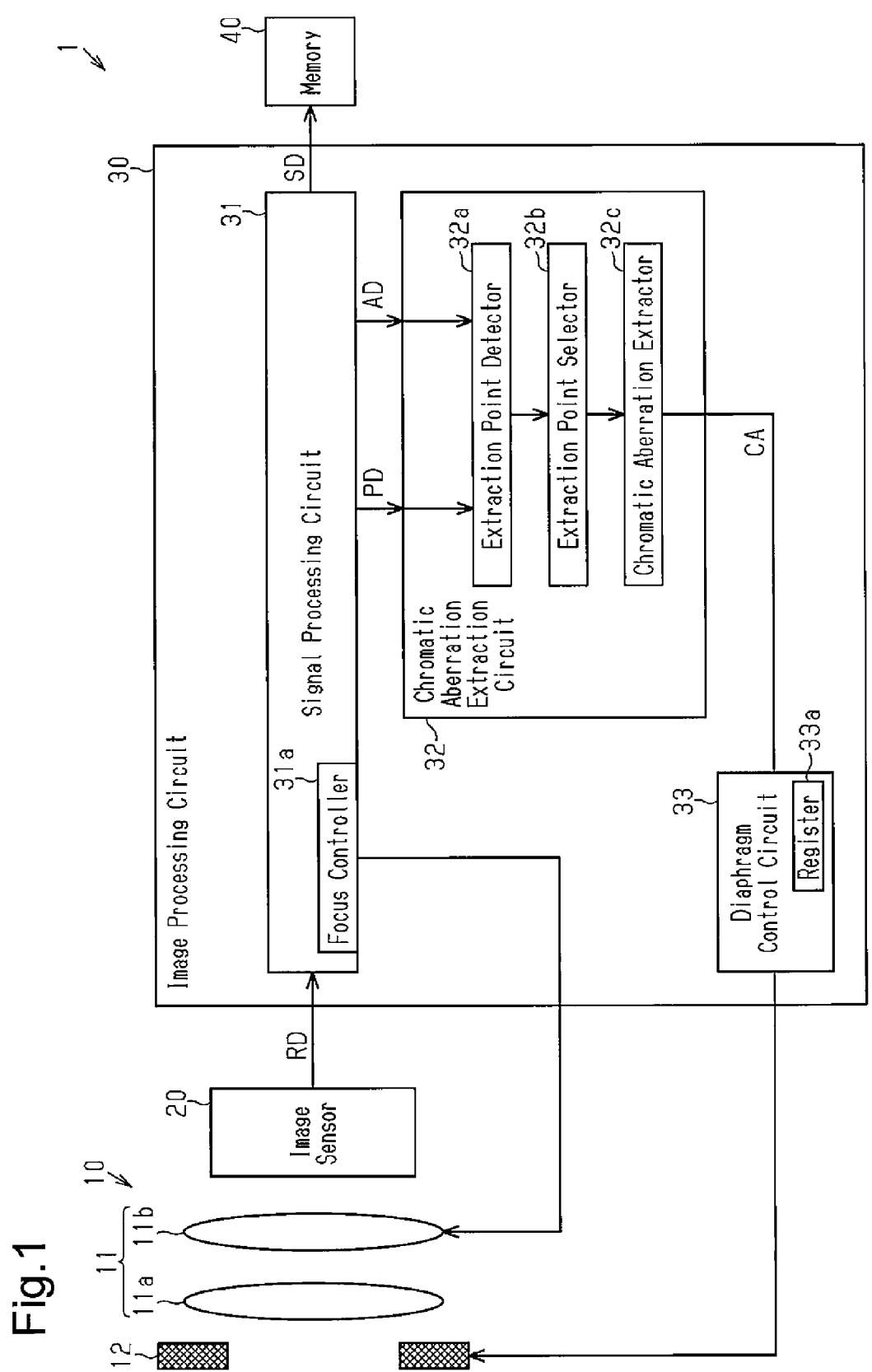
FIG. 1 is a schematic block diagram of an imaging device.

One embodiment will now be described. An imaging device 1 illustrated in FIG. 1 is, for example, a digital still camera. The imaging device 1 includes an imaging optical system 10, an image sensor 20, an image processing circuit 30, and a memory 40.

For example, the imaging optical system 10 may be a lens device that is attached in a removable manner to a device body including the image sensor 20. That is, the imaging optical system 10 may be replaceable. The imaging optical system 10 includes a lens 11, which collects light from a subject, and a diaphragm 12.

The lens 11 includes a fixed lens 11a and a movable lens 11b. The fixed lens 11a and the movable lens 11b each have an optical axis that coincides with the other optical axis. The optical axis is orthogonal to a light receiving surface of the image sensor 20 at a central location of the light receiving surface. The movable lens 11b is movable in a direction in which the optical axis extends. The movable lens 11b is a focus lens, which adjusts the focus of a captured image. The movement of the movable lens 11b in the optical axis direction adjusts the focus of an image of the subject on the light receiving surface of the image sensor 20. The fixed lens 11a is one of a group of lenses excluding the movable lens 11b, which is used to adjust the focus. For example, when the imaging optical system 10 includes a zoom lens, the zoom lens includes the fixed lens 11a and a lens that is movable to change a focal length to the fixed lens 11a.

The diaphragm 12 is arranged in parallel to a plane perpendicular to the optical axis. The diaphragm 12 includes, for example, a circular aperture. The diaphragm 12 can change the size of the aperture. The diaphragm 12 adjusts the amount of light passing through the lens 11.

The image sensor 20 includes, for example, a color filter having the Bayer arrangement and an imaging element (optical-electrical conversion element) including pixels. Examples of the imaging element include a charge coupled device (CCD) and a complementary metal oxide semiconductor (CMOS). When the image of the subject undergoes the optical-electrical conversion, the image sensor 20 generates an imaging signal, which is an analog signal, and converts the imaging signal to image data RD, which is a digital signal.

The image processing circuit 30 includes a signal processing circuit 31, a chromatic aberration extraction circuit 32, and a diaphragm control circuit 33.

The signal processing circuit 31 receives the output data (image data RD) of the image sensor 20 as input image data. Then, the signal processing circuit 31 performs various types of image processing on the input image data (image data RD) to generate pieces of image data PD, SD. The image data PD is provided to the chromatic aberration extraction circuit 32. The image data SD is stored in the memory 40. The image data RD output by the image sensor 20 includes, for example, RGB image data. The image processing includes, for example, correction processing and conversion processing. The correction processing includes, for example, pre-processing (e.g., color balance adjustment, gain adjustment, and defective signal correction), image stabilization processing that corrects misalignment between consecutive images (frames), and edge emphasis processing. The conversion processing includes, for example, color space conversion, which converts RGB image data to YCbCr image data, and image compression, which converts image data to a predetermined format (e.g., JPEG format). The image data PD, which is provided to the chromatic aberration extraction circuit 32, is, for example, RGB image data. The image data SD is image compression data.

The signal processing circuit 31 calculates an AF evaluation value, which indicates a focus state, based on the input image data (image data RD). For example, the signal processing circuit 31 extracts luminance signals from the input image data and cumulates high-frequency components of the luminance signals in the image. This calculates the AF evaluation value of the input image data. The AF evaluation value is, for example, the contrast intensity of the input image data.

The signal processing circuit 31 includes a focus controller 31a. The focus controller 31a performs AF control based on the AF evaluation value so that the subject is focused. For example, the imaging optical system 10 includes a drive controller. The drive controller drives an actuator (e.g., stepper motor) based on an output signal of the focus controller 31a to change the position of the movable lens 11b. The focus controller 31a detects a focal position based on the AF evaluation value and controls the drive controller so that the movable lens 11b moves to the focal position. The AF control may use a known process, for example, the hill-climbing process. The signal processing circuit 31 outputs focus control information AD (AF data) that includes an autofocus (AF) position as position information.

Figure 6A:
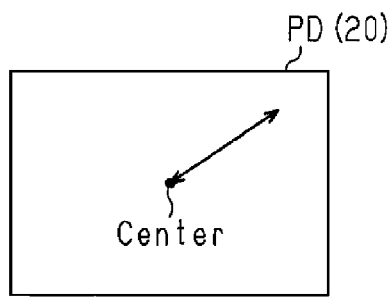
FIGS. 6A and 6B are diagrams illustrating the condition in which the chromatic aberration is easily detected.
Figure 6B:
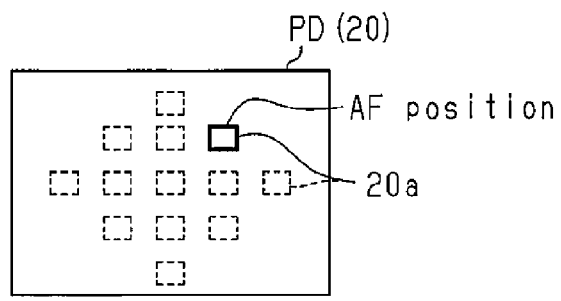

FIG. 6B illustrates an example of the AF position in the image data PD. The value of the image data PD is based on pixel data in an imaging region (light receiving region) of the image sensor 20 illustrated in FIG. 1. The imaging region (or viewfinder area) includes a plurality (e.g., thirteen) of focus areas 20a (AF areas). In FIG. 6B, the focus areas 20a are illustrated overlapping the image data PD.

The signal processing circuit 31 illustrated in FIG. 1 calculates an AF evaluation value of each focus area 20a based on the pixel data of the focus area 20a. The focus controller 31a performs the AF control based on the AF evaluation value of the focus area 20a. For example, the focus controller 31a performs the AF control using the AF evaluation value of one of the focus areas 20a in which the focal position is detectable or easily detected. The focus control information AD includes information of the focus area 20a that is used in the AF control as the AF position (position information).

The chromatic aberration extraction circuit 32 receives the image data PD from the signal processing circuit 31 and extracts a chromatic aberration CA from the image data PD.

The diaphragm control circuit 33 changes the f-number of the diaphragm 12 based on the chromatic aberration CA extracted by the chromatic aberration extraction circuit 32. For example, the diaphragm control circuit 33 sets the f-number so that the chromatic aberration CA is minimal.

In the imaging device 1 using the lens 11, a chromatic aberration is generated in accordance with the refractive index corresponding to the wavelength of light.

Figure 2:
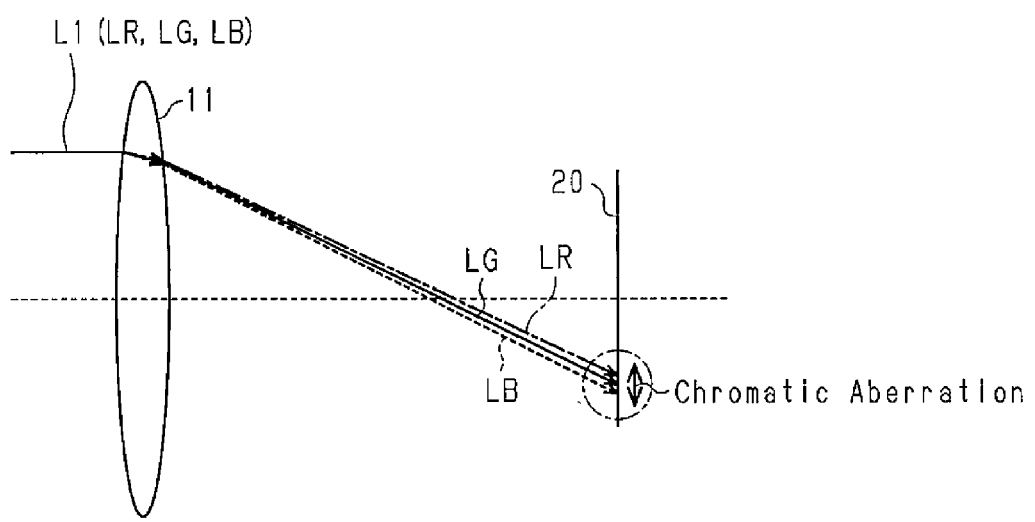
FIG. 2 is a schematic diagram illustrating chromatic aberration.

As illustrated in FIG. 2, white light L1 enters the lens 11. The white light L1 includes light LR having a red-wavelength component, light LG having a green-wavelength component, and light LB having a blue-wavelength component. The refractive indexes of the lights LR, LG, LB in the lens 11 differ in correspondence with the wavelengths of the lights LR, LG, LB. Thus, the incident positions (light receiving positions) of the lights LR, LG, LB on the image sensor 20 differ in correspondence with the wavelengths of the lights LR, LG, LB. For example, when capturing an image of a subject, an edge of the captured image may be expressed in color including the lights LR, LG, LB (e.g., white). In this case, the pixel position of each color may be deviated from the edge of the image. Such pixel deviations result in a chromatic aberration. The chromatic aberration leads to, for example, a color blur at the edge of the image captured by the imaging device 1. Thus, the chromatic aberration decreases the resolution of the image data and hinders detailed reproduction of the subject image.

The adjustment of the aperture diameter of the diaphragm 12 allows the chromatic aberration to be controlled for a certain extent.

Figure 5A:
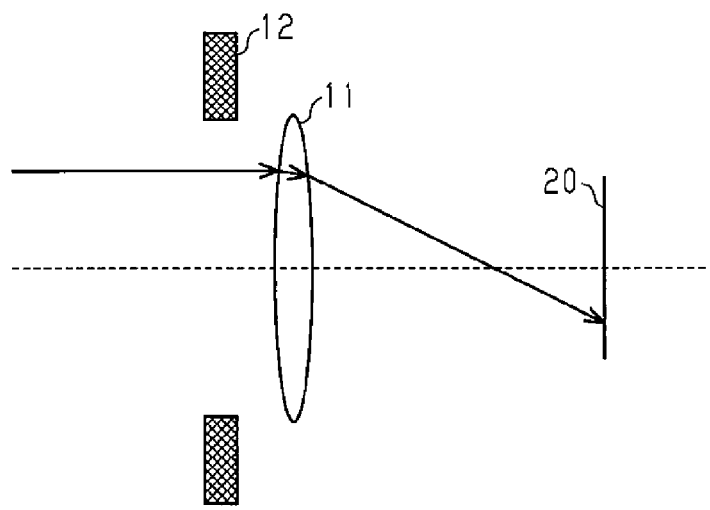
FIG. 5A is a schematic diagram illustrating light entering a lens when a diaphragm is located at a maximum aperture position.
Figure 5B:
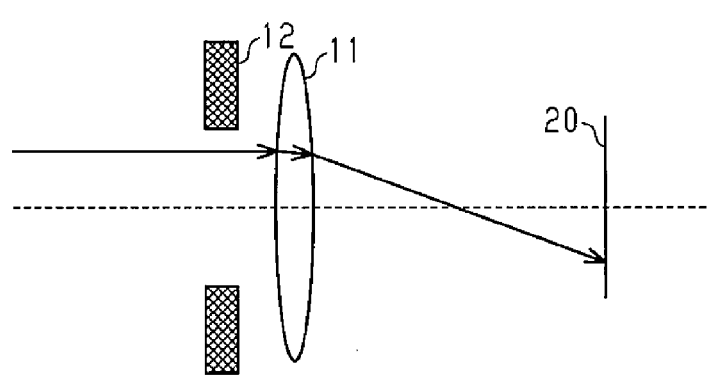
FIG. 5B is a schematic diagram illustrating light entering the lens when the diaphragm is closed from the maximum aperture position.

An example illustrated in FIG. 5B in which the f-number of the diaphragm 12 is changed to close the diaphragm 12 from the maximum aperture position illustrated in FIG. 5A will now be described. In the state illustrated in FIG. 5B, an outer area of the lens 11 is not used. Thus, the chromatic aberration is small compared to the state illustrated in FIG. 5A. In other words, the chromatic aberration decreases when the diaphragm 12 is closed from the maximum aperture position. When the diaphragm 12 is further closed, the chromatic aberration increases due to diffraction.

Figure 3:
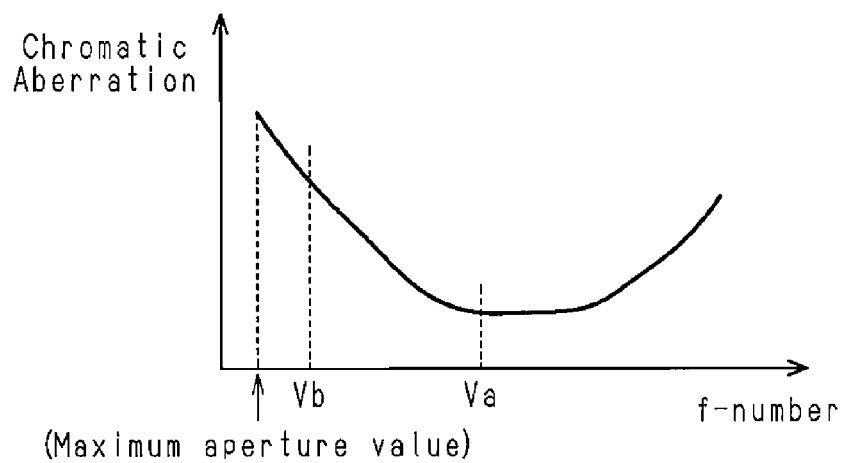
FIG. 3 is a graph illustrating the properties of the chromatic aberration relative to the f-number.

Accordingly, as illustrated in FIG. 3, when the f-number of the diaphragm 12 gradually increases from the maximum aperture value of the f-number of the diaphragm 12 (left end of the graph in FIG. 3), the chromatic aberration first gradually decreases and then increases. Thus, the f-number at which the chromatic aberration is minimal may be detected by changing the f-number of the diaphragm 12. When the f-number of the diaphragm 12 is adjusted so that the chromatic aberration is minimal, the imaging device 1 may obtain an image having the optimal resolution. This limits decreases in the resolution.

For example, in a pixel row extending orthogonal to the edge of the subject, which is expressed by color including the lights LR, LG, LB, the pixel value of each color corresponds to light entering the pixel of the image sensor 20.

Figure 4A:
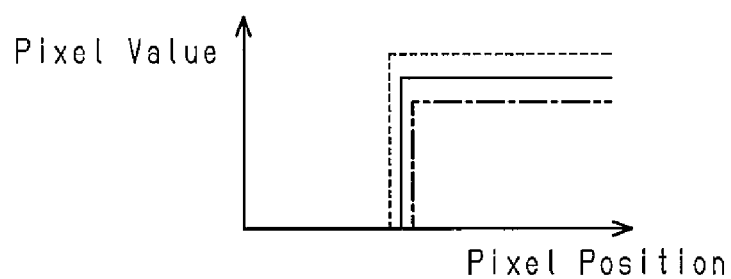
FIG. 4A is a schematic diagram illustrating the properties of the chromatic aberration when the f-number is Va illustrated in FIG. 3.
Figure 4B:
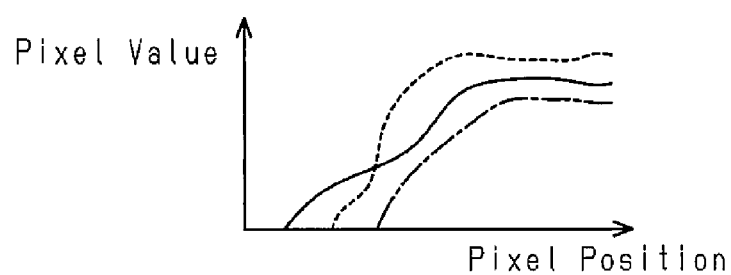
FIG. 4B is a schematic diagram illustrating the properties of the chromatic aberration when the f-number is Vb illustrated in FIG. 3.

For example, FIG. 4A illustrates changes in the pixel values when the f-number is "Va", which is illustrated in FIG. 3. FIG. 4B illustrates changes in the pixel values when the f-number is "Vb", which is illustrated in FIG. 3. In FIGS.

4A and 4B, broken lines indicate the pixel value of a blue pixel, solid lines indicate the pixel value of a green pixel, and dashed lines indicate the pixel value of a red pixel. As illustrated in FIG. 4A, when the f-number equals Va, which obtains the minimal chromatic aberration, the changes in the pixel values are limited.

As illustrated in FIG. 1, the chromatic aberration extraction circuit 32 includes an extraction point detector 32a, an extraction point selector 32b, and a chromatic aberration extractor 32c.

The extraction point detector 32a detects a plurality of extraction points suitable for extraction of the chromatic aberration based on the image data PD and the focus control information AD.

For example, an extraction point corresponds to an edge including a plurality of color components. The chromatic aberration is the difference in an imaged position caused by differences in the refraction index of the lights LR, LG, LB passing through the lens 11. Thus, a plurality of extraction points is detected from a region (pixel row) including the edge of the subject.

The extraction point detector 32a detects extraction points based on the focus control information AD corresponding to the AF control.

Referring to FIG. 6B, an AF position indicated by solid lines is the focus area 20a used in the AF control. The image data in the AF position is used to control the movable lens 11b (focus lens) to the focal position so that the image is focused. At an edge close to the AF position, the pixel values steeply vary relative to the pixel positions. That is, the edge is clear. At such an edge, the chromatic aberration may be easily detected. Thus, the extraction point detector 32a detects extraction points from the region including the edge close to the AF position.

The extraction point detector 32a may detect extraction points based on a shake amount detected by the image processing circuit 30. For example, the image processing circuit 30 detects the shake amount from the deviation amount in successive images (frames) of the subject captured in a short exposure period, that is, the difference in the pixel positions when successively capturing images of the subject. An imaged edge in a portion where the shake amount is small is clearer than an imaged edge in a portion where the shake amount is large. Thus, when an extraction point is set in a portion where the shake amount is small, the chromatic aberration may be easily detected. Additionally, the extraction point detector 32a may detect extraction points based on the AF position and the shake amount.

The extraction point selector 32b selects one of the extraction points detected by the extraction point detector 32a.

As illustrated in FIG. 6A, the chromatic aberration becomes more significant at locations that are farther from the center of the image data PD (image sensor 20), that is, at locations closer to the outer edge of the image. Thus, the chromatic aberration may be detected more easily at extraction points that are farther from the center of the image. In this manner, the extraction point selector 32b selects one of the extraction points in accordance with the condition that allows for easy detection of the chromatic aberration.

The chromatic aberration extractor 32c extracts the chromatic aberration CA based on the image data of the selected extraction point. For example, the chromatic aberration extractor 32c extracts pixel positions of red, green, and blue corresponding to the edge from the image data of the extraction point. Then, the chromatic aberration extractor 32c calculates the chromatic aberration CA based on the positions of the edge pixels. For example, a white edge includes color components of red, green, and blue. In this case, the chromatic aberration extractor 32c extracts the difference of the edge pixels (pixel positions) of two colors (e.g., red and blue), with which the chromatic aberration is easily detected, as the chromatic aberration CA.

The diaphragm control circuit 33 sets the f-number of the diaphragm 12 to the maximum aperture value and obtains the chromatic aberration CA from the chromatic aberration extraction circuit 32. The diaphragm control circuit 33 increases the f-number of the diaphragm 12 (i.e., closes the diaphragm 12). When the f-number is increased, the diaphragm control circuit 33 obtains the chromatic aberration CA again. For example, the diaphragm control circuit 33 increases the f-number of the diaphragm 12 in a stepped manner and obtains the chromatic aberration CA in each step. Then, the diaphragm control circuit 33 sets the f-number of the diaphragm 12 to a value at which the chromatic aberration CA is minimal.

For example, when the f-number of the diaphragm 12 is gradually increased from the maximum aperture value, the chromatic aberration CA decreases in accordance with the f-number and then increases due to diffraction. The diaphragm control circuit 33 calculates the difference of two consecutively obtained chromatic aberrations CA. When the difference is greater than the preceding value, the f-number at which the chromatic aberration CA is minimal may be obtained.

As illustrated in FIG. 3, the properties of the chromatic aberration with respect to the f-number of the diaphragm 12 may include a range in which changes in the chromatic aberration are small when the f-number changes, that is, a range of the f-number in which the properties of the chromatic aberration is flat. The diaphragm control circuit 33 may detect such a flat property of the chromatic aberration to set the f-number at which the chromatic aberration CA is minimal.

The diaphragm control circuit 33 includes, for example, a register 33a (memory). The register 33a stores a threshold value to determine the chromatic aberration. The diaphragm control circuit 33 compares a chromatic aberration extracted by the chromatic aberration extractor 32c with the threshold value stored in the register 33a. For example, the diaphragm control circuit 33 calculates the difference of two consecutively obtained chromatic aberrations CA. The diaphragm control circuit 33 compares the threshold value with the difference of the chromatic aberrations CA to determine whether or not the chromatic aberration CA is in a chromatic aberration setting range that includes the minimal value. For example, the threshold value is set in accordance with the flat property of the chromatic aberration, which is illustrated in FIG. 3. When the chromatic aberration indicates the flat property, the difference in the chromatic aberration is small. Thus, the threshold value may be set in accordance with the difference in the chromatic aberration illustrating the flat property. The maximal and minimal values of the chromatic aberration, which define the chromatic aberration setting range, may be changed in accordance with the threshold value.

In the determination of the chromatic aberration, when the chromatic aberration CA is decreased by the threshold or greater, the diaphragm control circuit 33 increases the f-number of the diaphragm 12. For example, the diaphragm control circuit 33 increases the count of an f-number counter (not illustrated) so that, for example, +1 is added to the f-number. When the chromatic aberration CA is not decreased by the threshold or greater, the diaphragm control circuit 33 determines whether or not the chromatic aberration CA is increased by the threshold value or more. When the chromatic aberration CA is not increased by the threshold value or greater, the diaphragm control circuit 33 increases the count to increase the f-number. When the chromatic aberration CA is increased by the threshold or greater, the diaphragm control circuit 33 decreases the f-number to set the f-number that corresponds to the preceding count. Such an f-number corresponds to the minimal chromatic aberration CA in the chromatic aberration setting range.

The setting of the f-number of the diaphragm 12 affects the shutter speed and the incident light amount of the image sensor 20. For example, the shutter speed is set in accordance with exposure. When the shutter speed is increased by setting the f-number in the above manner, an image may be obtained with a small shake amount.

The processing performed by the image processing circuit 30 will now be described.

Figure 7:
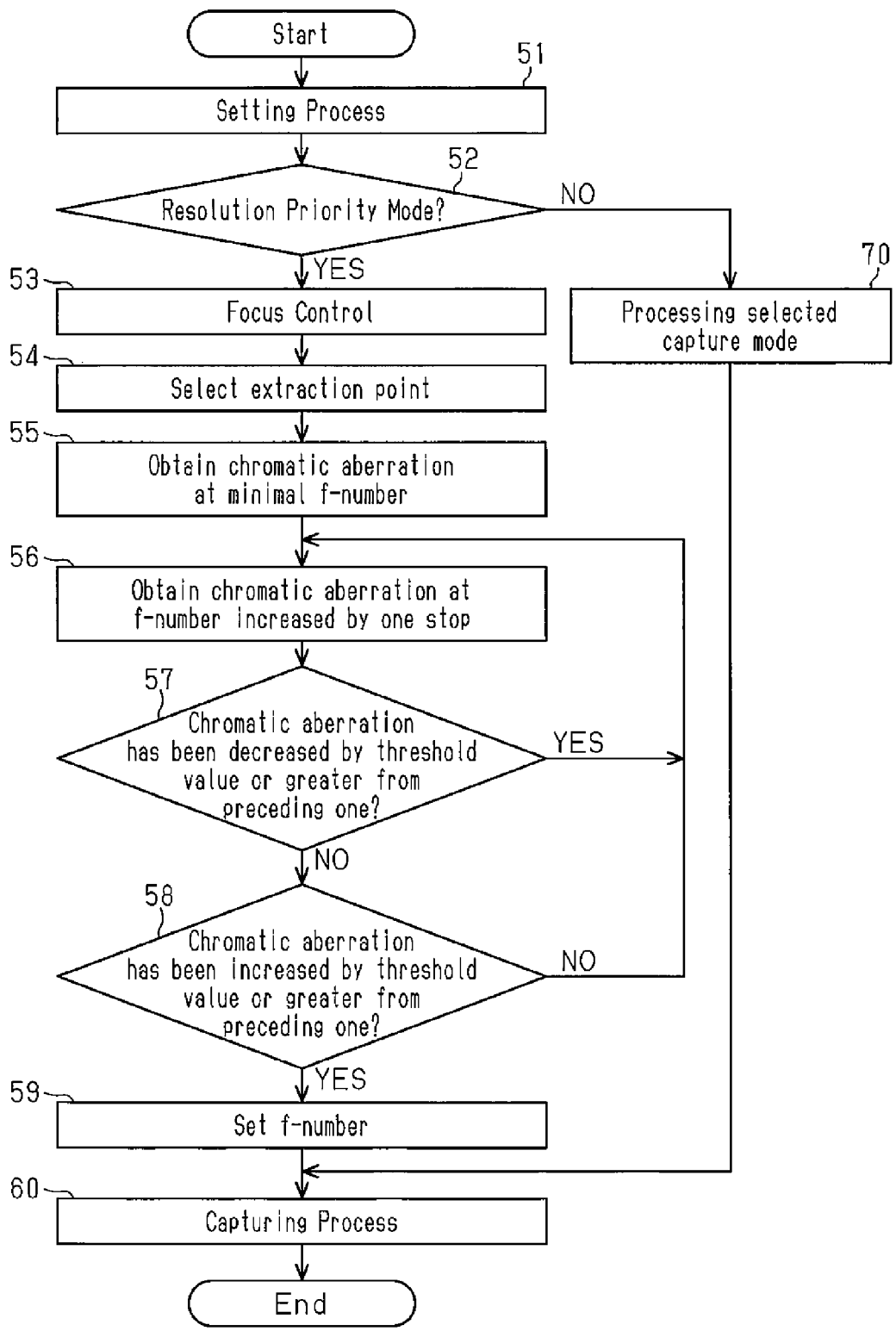
FIG. 7 is a schematic flowchart illustrating the procedures in a resolution priority mode.

Referring to FIG. 7, in step 51, the image processing circuit 30 performs a setting process. The setting process includes, for example, initialization performed when activated, the setting of capture conditions and the like, the selection of capture modes, and the resetting of the count of the f-number counter (setting the count to "zero").

In step 52, the image processing circuit 30 determines whether or not the capture mode selected in step 51 is a resolution priority mode. When the capture mode is the resolution priority mode (step 52: YES), the procedure proceeds to the next step 53.

In step 53, the signal processing circuit 31 performs focus control (AF control). In step 54, the chromatic aberration extraction circuit 32 selects a single extraction point at which the chromatic aberration CA is easily extracted. In this example, the extraction point detector 32a uses the focus control information AD to detect a plurality of extraction points (chromatic aberration detection positions) suitable for extraction of the chromatic aberration from the image data PD. Then, the extraction point selector 32b selects one of the extraction points, for example, based on the distance from the center of the image data PD.

In step 55, the chromatic aberration extractor 32c obtains the chromatic aberration CA of the selected extraction point when the f-number is minimal.

In step 56, the diaphragm control circuit 33 increases the f-number by one stop and obtains the chromatic aberration CA again.

In step 57, the diaphragm control circuit 33 determines whether or not the current chromatic aberration CA has been decreased by the threshold value or greater from the preceding chromatic aberration CA. When the chromatic aberration CA has been decreased by the threshold value or greater (step 57: YES), the procedure returns to step 56. In step 56, the diaphragm control circuit 33 increases the f-number by one stop and obtains a new chromatic aberration CA. When the chromatic aberration CA is not decreased by the threshold value or greater (step 57: NO), the processing proceeds to step 58.

In step 58, the diaphragm control circuit 33 determines whether or not the current chromatic aberration CA has been increased by the threshold or greater from the preceding chromatic aberration CA. When the current chromatic aberration CA has not been increased by the threshold or greater (step 58: NO), the chromatic aberration CA is in the chromatic aberration setting range. In this case, the processing proceeds to step 56. In step 56, the diaphragm control circuit 33 increments the count to increase the f-number by one stop and obtain a new chromatic aberration CA. Then, when the newly obtained chromatic aberration CA is increased by the threshold value or greater (step 58: NO), the processing proceeds to step 59.

In step 59, the diaphragm control circuit 33 sets the f-number in accordance with the count. For example, the diaphragm control circuit 33 decreases the f-number to set the f-number that corresponds to the preceding count. Such an f-number corresponds to the first chromatic aberration CA in the chromatic aberration setting range.

In step 60, the capturing process is performed in accordance with the f-number that is set in step 59. Referring to FIG. 1, the image sensor 20 outputs the image data RD. The image data RD is processed to obtain the image data SD. The image data SD is stored in, for example, the memory 40.

In step 52 described above, when the capture mode is one other than the resolution priority mode (exposure priority mode, shutter speed priority mode, or the like) (step 52: NO), the processing proceeds to step 70. In step 70, processing is performed in correspondence with the selected capture mode. For example, in the exposure priority mode, the shutter speed is set in correspondence with selected exposure (f-number), and the focus control is performed. Then, in step 60, the capturing process is performed.

The operation of the imaging device 1 (image processing circuit 30) will now be described.

The image processing circuit 30 of the imaging device 1 includes the signal processing circuit 31, the chromatic aberration extraction circuit 32, and the diaphragm control circuit 33. The chromatic aberration extraction circuit 32 extracts the chromatic aberration from the image data PD. The diaphragm control circuit 33 sets the f-number of the diaphragm 12 based on the chromatic aberration CA output from the chromatic aberration extraction circuit 32. For example, the diaphragm control circuit 33 sets the f-number so that the chromatic aberration CA is minimal.

For example, in a conventional imaging device, when selecting the exposure priority mode, a user can select the f-number of the diaphragm. Thus, the user is able to adjust the f-number to decrease the chromatic aberration. However, excessive opening of the diaphragm results in the use of the outer region of the lens where chromatic aberration increases. This decreases the resolution. Excessive closing of the diaphragm causes outstanding diffraction of light and decreases the resolution. In such manual adjustments of the f-number, it is difficult to obtain the resolution from a display attached to the camera. Thus, efforts and experience are necessary to adjust the f-number.

In this regard, the imaging device 1 adjusts the f-number of the diaphragm 12 using the chromatic aberration CA obtained from the image data PD. That is, the f-number of the diaphragm 12 is automatically adjusted by the imaging device 1. The image data SD, which is obtained using such an automatically adjusted f-number, has a small chromatic aberration CA. Thus, the image data SD having a high resolution may be easily obtained.

Additionally, the imaging device 1 processes the image data RD, which is output from the image sensor 20, to obtain the image data PD. The imaging device 1 extracts the chromatic aberration CA from the image data PD and adjusts the f-number of the diaphragm 12 based on the chromatic aberration CA. Thus, even when the lens of the imaging optical system 10 is replaced, the image data SD having a high resolution may be obtained as long as the imaging optical system 10 is capable of controlling the f-number of the diaphragm 12.

This embodiment has the advantages described below.

(1) The image processing circuit 30 of the imaging device 1 includes the signal processing circuit 31, the chromatic aberration extraction circuit 32, and the diaphragm control circuit 33. The chromatic aberration extraction circuit 32 extracts the chromatic aberration CA from the image data PD. The diaphragm control circuit 33 changes the f-number of the diaphragm 12. Then, the diaphragm control circuit 33 sets the f-number of the diaphragm 12 based on the chromatic aberration CA extracted by the chromatic aberration extraction circuit 32. For example, the diaphragm control circuit 33 sets the f-number so that the chromatic aberration CA is minimal.

Thus, the imaging device 1 adjusts the f-number of the diaphragm 12 using the chromatic aberration CA obtained from the image data PD. That is, the f-number of the diaphragm 12 is automatically adjusted by the imaging device 1. The image data SD, which is obtained using such an automatically adjusted f-number, has a small chromatic aberration CA. Thus, the image data SD having a high resolution may be easily obtained.

(2) The imaging device 1 processes the image data RD, which is output from the image sensor 20, to obtain the image data PD. The imaging device 1 extracts the chromatic aberration CA from the image data PD and adjusts the f-number of the diaphragm 12 based on the chromatic aberration CA. Thus, even when the lens of the imaging optical system 10 is replaced, the image data SD having a high resolution may be obtained as long as the imaging optical system 10 is capable of controlling the f-number of the diaphragm 12.

It should be apparent to those skilled in the art that the above embodiment may be embodied in many other specific forms without departing from the scope of the invention. Particularly, it should be understood that the above embodiment may be embodied in the following forms.

The imaging device 1 of the embodiment may be applied to a digital video camera capable of capturing a still image and a moving image.

FIG. 1 illustrates a schematic diagram of the imaging optical system 10 including a lens used for control. The imaging optical system 10 is not limited to the structure illustrated in FIG. 1. For example, the imaging optical system 10 may include a lens unit including a plurality of lens groups such as a lens unit having a zoom function.

In an imaging optical system having the chromatic aberration properties illustrated in FIG. 3, the means for setting the f-number of the diaphragm 12 in accordance with a detected chromatic aberration may be modified. For example, f-number setting information may be stored in the register 33a, which is illustrated in FIG. 1. The f-number setting information includes, for example, "open", "intermediate", and "close". For example, when "close" is selected, a control is performed so that the diaphragm 12 is closed. This adjusts the resolution to the same level as the embodiment so that an image having a large depth of field may be obtained.

Alternatively, the setting of the f-number may be adjusted at an open side or a closed side in accordance with, for example, a shutter speed or a capture mode (subject selection, such as landscape or portrait).

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments of the present invention have been described in detail, it should be understood that various changes, substitutions, and alterations could be made hereto without departing from the spirit and scope of the invention.

The invention claimed is:

1. An image processing device comprising:
 a signal processing circuit configured to generate image data by signal-processing output data generated by an image sensor in accordance with light passing through a diaphragm and a lens;
 a chromatic aberration extraction circuit configured to extract a chromatic aberration from the image data; and
 a diaphragm control circuit configured to change an f-number of the diaphragm, wherein the diaphragm control circuit is configured to set the f-number of the diaphragm based on the chromatic aberration extracted by the chromatic aberration extraction circuit,
 wherein
 the signal processing circuit includes a focus controller configured to perform focus-processing by controlling the lens, and
 the chromatic aberration extraction circuit includes:
  an extraction point detector configured to detect a plurality of extraction points which are close to an autofocus position set by the focus-processing, and at which the chromatic aberration is extracted from the image data;
  an extraction point selector configured to select one of the extraction points based on a distance from a center of the image data; and
  a chromatic aberration extractor configured to extract chromatic aberration at the one of the extraction points selected by the extraction point selector.

2. The image processing device according to claim 1, wherein the diaphragm control circuit includes a memory configured to store a threshold value, and the diaphragm control circuit is configured to set the f-number based on a comparison of an amount of change in the chromatic aberration and the threshold value.

3. The image processing device according to claim 1, wherein the diaphragm control circuit is configured to set a minimal one of the f-numbers corresponding to the chromatic aberration in a setting range.

4. A method for controlling an image processing device, the method comprising:
 generating image data by signal-processing output data generated by an image sensor in accordance with light passing through a diaphragm and a lens;
 performing focus-processing by controlling the lens;
 detecting a plurality of extraction points which are close to an autofocus position set by the focus-processing, and at which the chromatic aberration is extracted from the image data;
 selecting one of the extraction points based on a distance from a center of the image data;
 extracting a chromatic aberration at the one of the extraction points selected by the selecting; and
 changing an f-number of the diaphragm, wherein the changing an f-number of the diaphragm includes setting the f-number based on the chromatic aberration extracted by the extracting.

5. An imaging device comprising:
 an imaging optical system that includes a diaphragm and a lens;
 an image sensor configured to generate output data in accordance with light passing through the diaphragm and the lens; and an image processing circuit configured to process the output data of the image sensor, wherein the image processing circuit includes
  a signal processing circuit configured to generate image data by signal-processing the output data,
  a chromatic aberration extraction circuit configured to extract a chromatic aberration from the image data, and
  a diaphragm control circuit configured to change an f-number of the diaphragm, wherein the diaphragm control circuit is configured to set the f-number of the diaphragm based on the chromatic aberration extracted by the chromatic aberration extraction circuit, wherein
the signal processing circuit includes a focus controller configured to perform focus-processing by controlling the lens, and
the chromatic aberration extraction circuit includes:
  an extraction point detector configured to detect a plurality of extraction points which are close to an autofocus position set by the focus-processing, and at which the chromatic aberration is extracted from the image data;
  an extraction point selector configured to select one of the extraction points based on a distance from a center of the image data; and
  a chromatic aberration extractor configured to extract chromatic aberration at the one of the extraction points selected by the extraction point selector.

* * * * *